Figure 1:
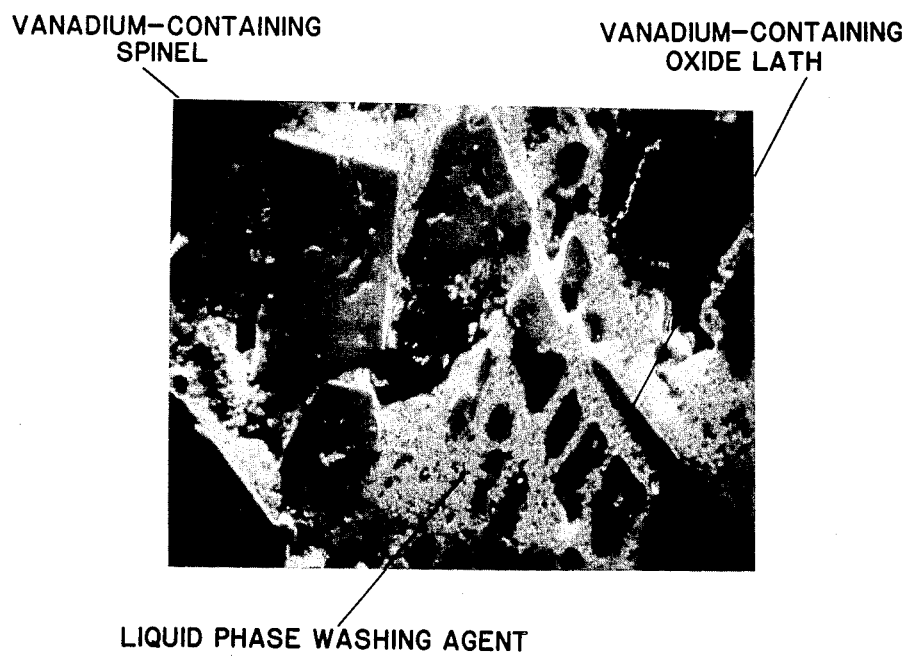

United States Patent [19]

Najjar

[11] Patent Number: 4,668,428

[45] Date of Patent: * May 26, 1987

[54] PARTIAL OXIDATION PROCESS

[75] Inventor: Mitri S. Najjar, Hopewell Junction, N.Y.

[73] Assignee: Texaco Inc., White Plains, N.Y.

[*] Notice: The portion of the term of this patent subsequent to May 26, 2004 has been disclaimed.

[21] Appl. No.: 749,375

[22] Filed: Jun. 27, 1985

[51] Int. Cl.$^4$ .............................. C07C 3/36; C10J 3/46
[52] U.S. Cl. .................................. 252/373; 48/197 R
[58] Field of Search ............................................. 252/373

[56] References Cited

U.S. PATENT DOCUMENTS

| | | | |
|---|---|---|---|
| 3,542,532 | 11/1970 | Johnson et al. | 252/373 |
| 3,916,617 | 11/1975 | McKenzie et al. | 252/373 |
| 3,920,579 | 11/1975 | Slater | 252/373 |
| 4,060,478 | 11/1977 | Lang | 252/373 |
| 4,331,529 | 5/1982 | Lambert et al. | 252/373 |
| 4,336,034 | 6/1982 | Lang et al. | 252/373 |
| 4,431,622 | 2/1984 | Moss | 252/373 |
| 4,436,531 | 3/1984 | Estabrook et al. | 252/373 |
| 4,439,210 | 3/1984 | Lancet | 252/373 |
| 4,440,546 | 4/1984 | Lancet et al. | 252/373 |
| 4,466,807 | 8/1984 | Santén et al. | 252/373 |

FOREIGN PATENT DOCUMENTS

| | | | |
|---|---|---|---|
| 461561 | 1/1971 | Japan | 252/373 |
| 58-194985 | 11/1983 | Japan | 252/373 |
| 92470 | 7/1958 | Norway | 252/373 |

*Primary Examiner*—Natalie Trousof
*Assistant Examiner*—Bruce D. Gray
*Attorney, Agent, or Firm*—Robert A. Kulason; James J. O'Loughlin; Alber Brent

[57] ABSTRACT

Synthesis gas is produced by the partial oxidation of a feedstock comprising petroleum coke and/or heavy liquid hydrocarbonaceous fuel containing sulfur and having an ash that contains nickel, vanadium and a comparatively low level of silicon. An iron-containing additive is introduced into the reaction zone along with the feed. The additive combines with at least a portion of the nickel constituents and sulfur found in the feedstock to produce a liquid phase washing agent that collects and transports at least a portion of the vanadium-containing oxide laths and spinels and other ash components out of the reaction zone. In another embodiment, a minor amount of an additional material selected from the group of elements consisting of magnesium, chromium and mixtures thereof is included in the iron-containing additive. In still another embodiment, the iron-containing additive is uniformly dispersed in petroleum coke having a nickel and vanadium-containing ash. By this method molten slag having a reduced viscosity and containing the nickel and vanadium-containing impurities from the feedstock are readily removed from the gas generator at a lower temperature. Further, the life of the refractory lining is extended.

29 Claims, 1 Drawing Figure

VANADIUM-CONTAINING SPINEL

VANADIUM-CONTAINING OXIDE LATH

LIQUID PHASE WASHING AGENT

PARTIAL OXIDATION PROCESS

FIELD OF THE INVENTION

This invention relates to the partial oxidation of ash-containing heavy liquid hydrocarbonaceous fuels ash-containing petroleum coke, or mixtures thereof to produce gaseous mixtures comprising $H_2+CO$. More particularly it pertains to an additive system for removing nickel and vanadium-containing contaminants along with other molten ash components which are produced during the partial oxidation of a heavy liquid hydrocarbonaceous fuel having a nickel and vanadium-containing ash, petroleum coke having a nickel and vanadium-containing ash or mixtures thereof to produce synthesis gas, reducing gas, or fuel gas.

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke or the ash-containing heavy liquid hydrocarbonaceous fuel. For example, water slurries of petroleum coke are reacted by partial oxidation in coassigned U.S. Pat. No. 3,607,157. Gasification is often cited as a convenient means of coke disposition. The Flexicoking Process is an integrated coker/gasifier operation but is often criticized because of the gasifier design. Further, no molten petroleum coke ash having a reduced ash fusion temperature is produced. The decision to use gasification as a coke disposal means is generally based on economics. The expected rise in energy costs and legislation (primarily Canadian) requiring total use of feed crude should shortly bring about a great utilization of petroleum coke feeds to the partial oxidation gas generator.

Previous gasification runs with delayed coke and ash-containing heavy liquid hydrocarboneous fuel gave rise to some unexpected operating problems. The ash, which normally melts and is discharged from the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel carbonyl deposits downstream in the system. Fluxing as used in coal operations and in U.S. Pat. Nos. 1,799,885 and 2,644,745 do not provide a solution to applicant's problem involving troublesome vanadium and nickel. The subject invention is an improvement in the art since it permits long time operation of the partial oxidation gas generator without shut-down due to failure of the refractory lining in the reaction zone that was brought about by the presence of vanadium.

SUMMARY OF THE INVENTION

This is a process for the production of gaseous mixtures comprising $H_2+CO$ by the partial oxidation of a feedstock comprising a heavy liquid hydrocarbonaceous fuel having a nickel and vanadium-containing ash or petroleum coke having a nickel and vanadium-containing ash, or mixtures thereof. Further, said feedstock includes a minimum of 0.5 wt. % of sulfur; and said ash includes a minimum of 5.0 wt. % of vanadium, a minimum of 2.0 wt. % of nickel, such as 2.0 to 5.0 wt. %, and less than about 350 parts per million (ppm) of silicon. The process includes the steps of (1) mixing together an iron-containing additive with said feedstock; wherein the weight ratio of iron-containing additive to ash in the reaction zone in (2) is in the range of about 1.0–10.0 to 1.0, and there is at least 10 parts by weight of iron for each part by weight of vanadium; (2) reacting said mixture from (1) at a in the range of 2200° F. to 3000° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and molten slag; and wherein said reaction zone said iron-containing additive combines with at least portion of said nickel constituents and sulfur found in the feedstock to generate a liquid phase washing agent that collects and transports at least a portion of the vanadium-containing oxide laths and spinels and other ash components and refractory out of the reaction zone; and (3) separating nongaseous materials from said hot raw effluent gas stream.

In another embodiment, a mixture of heavy liquid hydrocarbonaceous fuel having a nickel and vanadium-containing ash and said iron-containing additive is fed to a coker to produce petroleum coke with a nickel and vanadium-containing ash, and with said additive being uniformly dispersed throughout. This petroleum coke is then reacted in the partial oxidation gas generator to produce synthesis gas, reducing gas, or fuel gas.

In still another embodiment, a small amount of an additional additive selected from the group of elements consisting of magnesium, chromium, and mixtures thereof in the form of compounds, such as oxides is introduced into the reaction zone. The magnesium and chromium further increase the life of the refractory lining.

DISCLOSURE OF THE INVENTION

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive feedstocks comprising heavy liquid hydrocarbonaceous fuel and/or petroleum coke feedstocks having nickel and vanadium-containing ashes. Further, said feedstock includes a minimum of 0.5 wt. % of sulfur, such as at least 2.0 wt. % sulfur; and said ash includes a minimum of 5.0 wt. % of vanadium, a minimum of 2.0 wt. % of nickel, such as 2.0 to 5.0 wt. %, and less than about 350 parts per million (ppm) of silicon, such as about 50 to 300 ppm.

By definition, the term heavy liquid hydrocarbonaceous material or fuel having a nickel and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term petroleum coke having a nickel and vanadium-containing ash is petroleum coke made from ash containing heavy liquid hydrocarbonaceous fuel by conventional coking methods such as by the delayed or fluid coking process, such as described in coassigned U.S. Pat. No. 3,673,080, which is incorporated herein by reference.

Closer study of the ashes derived from the partial oxidation, without an additive, of a feedstock comprising heavy liquid hydrocarbonaceous fuels and/or petroleum coke having nickel and vanadium-containing ashes shows that they are largely composed of oxide and sulfide compounds of vanadium, nickel, iron, along with some normally occurring mineral matter species. Vanadium-containing oxide laths are present selected from the group consisting of V, V+Ca, V+Fe, V+Al, and mixtures thereof. Vanadium-containing spinels are present of the spinel-type aluminate phases with any metals selected from the group consisting of V, Fe, Cr, Al, Mg and mixtures thereof. The presence of abundant interlocking needle to lath-like crystals is the cause of the high viscosity of the slag.

The metals present in the ash provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10–20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated.

This invention provides an improved iron-containing additive. Further, a means of introducing this addition agent into the system to give maximum effectiveness is provided.

The iron-containing additive comprises an iron compound, preferably iron oxide. In the reaction zone of the partial oxidation gas generator, the additive combines with at least a portion, such as substantially all or a large fraction e.g. about 40 to 100 wt. %, say about 70 to 90 wt. % of the nickel constituents and sulfur found in the feedstock to produce a low viscosity liquid phase washing agent or carrier. Advantageously, the sulfur potential in the gas and downstream gas cleaning costs are substantially reduced or possibly eliminated. This washing agent is in the liquid phase at the temperature prevailing in the reaction zone and substantially comprises in wt. %: iron sulfide about 75 to 95, such as about 80 to 90; nickel sulfide about 0.5 to 3, such as about 1 to 2; and iron oxide about 2 to 9, such as about 3 to 6. The viscosity of this washing agent at 2000° F. is in the range of about 10 to 20 poises. Further, it was unexpectedly found that this liquid phase washing agent has a strong wetting capability for the high temperature non-flowing vanadium-containing oxide laths and spinels. This washing agent functions in a completely different manner than that of a fluxing additive which may be used for example to solubilize slag constituents in coal. For example, this washing agent does not solubilize the troublesome vanadium-containing oxide laths and spinels. Rather, it serves as a carrier and washes them out of the reaction zone. This washing agent washes at least a portion, such as from about 40 to 100 wt. %, such as about 60 to 80 wt. %, and preferably all of the vanadium-containing contaminants out of the reaction zone of the partial oxidation gas generator. The mixtures of this liquid phase washing agent and vanadium oxide is referred to herein as slag and comprises about 1 to 10 wt. %, such as about 4 to 8 wt. % of vanadium oxide. Further, it was unexpectedly found that high silicon e.g. greater than about 350 ppm would interfere with the formation of the liquid phase washing agent in the partial oxidation reaction zone.

In another embodiment, it was unexpectedly found that other benefits could be achieved by including in the iron-containing additive, an additional material selected from the group of elements consisting of magnesium, chromium, and mixtures thereof. The elements are provided as suitable compounds selected from the groups consisting of oxides, hydroxides, carbonates, bicarbonates, sulfates, nitrates and mixtures thereof. The total amount of the compounds of magnesium, chromium, and mixtures thereof in the additive may be in the range of about 1.0 to 10.0 wt. %, such as about 2.0 to 8.0 wt. % of the additive. The addition of the aforesaid supplemental amount of magnesium and/or chromium compound saturates the slag with respect to these constituents thereby preventing their dissolution from the refractory. The life of the refractory lining is thereby extended.

A suitable amount of iron-containing additive is introduced into the reaction zone along with the fuel feedstock in order to satisfy the following two ratios: (i) a wt. ratio of iron-containing additive to ash (noncombustable material) in the reaction zone in the range of about 1.0-10.0 to 1.0, such as at least 2:1 weight ratio, say about 5.0 parts by wt. % of iron-containing additive per part by wt. of ash in the feedstock; and (ii) at least 10 parts by weight, such as about 10-30, say 20 parts by weight of iron for each part by weight of vanadium.

Advantageously by the subject process, the molten slag which is produced in the reaction zone has a low viscosity e.g. less than 20 poises at 2000° F., in comparison with prior art high viscosity slag. This facilitates slag removal. Further, at shut-down of the gasifier, the refractory walls of the reaction zone are provided clean with substantially no net accumulation of vanadium contaminants.

The partial oxidation reaction takes place in a reducing atmosphere under the following conditions: temperature—2200° F. to 3000° F., such as about 2300° F. to 2700° F.; say about 2725° F. to 2825° F.; pressure about 5 to 250 atmospheres, such as about 15 to 200 atmospheres; when steam or water is used as a temperature moderator, the $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering the gas stream may be employed as synthesis gas, reducing gas or fuel gas.

Another aspect of this invention is that the iron-containing additive may be selected on the basis of serendipitous catalytic properties in addition to its use in the generation of the washing agent, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the iron-containing additive.

It was unexpectedly found that a preferred iron-containing additive for mixing with the heavy liquid hydrocarbonaceous material having a nickel and vanadium-containing ash or petroleum coke having a nickel and vanadium-containing ash includes iron compounds selected from the group consisting of oxides, sulfates, carbonates, cyanides, chlorides, nitrates, and mixtures thereof. In another embodiment, the iron compound is a water soluble iron salt. In still another embodiment the iron compound is a ferro or ferri organic compound selected from the group consisting of naphthenates, oxalates, acetates, citrates, benzoates, oleates, tartrates, and mixtures thereof.

In one embodiment of the subject invention the aforesaid mixture of fuel feedstock comprising heavy liquid hydrocarbonaceous fuel having a nickel and vanadium-containing ash and/or the petroleum coke having a nickel and vanadium-containing ash, and the iron-containing additive are introduced into the partial oxidation gasifier. In another embodiment, the iron-containing additive is mixed with the heavy liquid hydrocarbonaceous material having a nickel and vanadium-containing ash and the mixture is then fed into a conventional coking unit to produce petroleum coke. By this means, the finely ground iron-containing additive may be intimately mixed throughout the petroleum coke product. The preferable particle size of the comminuted iron-containing additive and the comminuted petroleum coke is in the range of ASTM E-11 Standard Sieve Designation about 210 microns to 37 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous material or both to produce a pumpable slurry having a solids content in the range of about 50–65 wt. %. Alternatively, the solid materials may be wet ground with the liquid slurry medium. Alternatively, the mixture of particulate solids may be entrained in a gaseous medium and then introduced into the gas generator. The gaseous transport medium may be selected from the group consisting of steam, $CO_2$, $N_2$, free-oxygen containing gas, recycle synthesis gas, and mixtures thereof.

In the embodiment wherein ground iron-containing additive is mixed with the heavy liquid hydrocarbonaceous fuel having a nickel and vanadium-containing ash and fed into a coker, the iron-containing washing additive may be introduced directly into the ash-containing petroleum liquid feed to the vacuum distillation tower, which normally precedes the coker unit. In either unit operation (coking or distillation), substantially all of the iron-containing additive should stay behind in the desired bottoms stream. In other words, there should be little, if any, carry over of the additive with the lighter products. A possible advantage for mixing the additive with the vacuum tower feedstream in preference to the bottoms stream (i.e. coker feed) is that the feed to the vacuum tower is significantly less viscous than the bottoms from the vacuum tower. A more thorough mixing may be thereby effected.

For example, a mixture comprising a high boiling liquid petroleum i.e. heavy liquid hydrocarbonaceous fuel having a nickel and vanadium-containing ash and the comminuted iron-containing additive at a temperature in the range of about 650° F. to 930° F. is introduced into a delayed coking zone, for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with iron-containing additive is removed from the bottom of said delayed coking zone.

In another embodiment, a mixture comprising a high boiling liquid petroleum having a nickel and vanadium-containing ash and the comminuted iron-containing additive at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems as discussed for coke. Thus, the invention of introducing an iron-containing additive as part of the petroleum processing prior to gasification should, depending on the specific process, produce a feedstock that will be free of the gasification problems mentioned above. Most of these processes employ vacuum distillation as pretreatment. Accordingly, as described above, the iron-containing addition agent may be mixed with the vacuum distillation feed having a nickel and vanadium-containing ash. The additive will then emerge from the distillation column in the bottoms stream. In turn, the bottoms stream is the feed stream for the upgrading process. This incorporation of the iron-containing additive should not adversely affect these processes, and the iron-containing addition agent should ultimately emerge with the vanadium-rich residue stream from each respective process. In all of these processes, this residue stream should be suitable for gasification by partial oxidation.

In still another embodiment of the invention, it was unexpectedly found that the softening temperature of the iron-containing addition agent could be reduced about 100°-300° F., such as about 200° F. by mixing a calcium compound with the previously described feedstock e.g. petroleum coke, liquid hydrocarbonaceous fuel, or mixtures thereof. The calcium compound may be selected from the group consisting of calcium oxide, calcium carbonate and calcium hydroxide. By adding calcium in this manner, the partial oxidation gas generator may be started up at a lower temperature e.g. about 200° to 300° F. lower. The calcium compound is temporarily introduced into the partial oxidation reaction zone at start-up in admixture with the feedstock and/or iron-containing addition agent in the critical amount of about 2.0 to 8.0 wt. % or below of the iron-containing addition agent. The calcium compound will lower the softening temperature of the iron-containing addition agent, thus enhancing the rate of sulfur pick-up in the slag. It was found that when the addition of calcium compound exceeded 8.0 wt. % of the iron-containing addition agent then calcium sulfide and calcium carbonate would clog up the central passage of the dip tube thereby blocking the discharge of the hot effluent gas stream from the reaction zone into the quench water.

Shortly after start-up when the sulfur begins to transfer into the molten slag, the liquid sulfide slag of iron and nickel will lower the softening temperature of the iron-containing agent thus eliminating thereafter the need of introducing calcium. Excess calcium will pick up the sulfur to form an undesirable viscous sulfide phase. Keeping the amount of calcium to 8.0 wt. % and below of the iron-containing addition agent will ensure the washing of the high melting calcium sulfide phase with the high melting vanadium laths and spinels. The use of calcium in this manner in admixture with the iron-containing additive is substantially different from its use as an ash fluxant, as described in coassigned U.S. Pat. No. 4,277,365.

EXAMPLE

The following examples are offered as a better understanding of the present invention, but the invention is not to be construed as limited thereto.

EXAMPLE I

Synthesis gas substantially comprising in mole % dry basis $H_2$ 25 to 45, CO 20 to 50, $CO_2$ 5 to 35, $CH_4$ 0.06 to 8.0, and $CO_2 + H_2S$ 0.1 to 2.0 is produced in a free-flow refractory lined partial oxidation reaction zone, such as that shown and described in coassigned U.S. Pat. No. 3,607,157, which is incorporated herein by reference. The feedstock comprises an atomized aqueous dispersion or a dispersion of substantially dry petroleum coke having a nickel and vanadium-containing ash and being entrained in a gaseous transport medium comprising a mixture of free-oxygen containing gas and steam. The ash in the petroleum coke comprises about 12.0 wt. % of vanadium, about 5.0 wt. % of nickel, and contains less than about 250 ppm of silicon. About 3.2 wt. % of sulfur is present in the petroleum coke. The petroleum coke has a nickel and vanadium-containing ash and also has uniformly dispersed therein an iron-containing additive comprising about 100 wt. % of iron oxide. The wt. ratio of iron-containing additive to ash is about 5 to 1. The weight ratio of iron to vanadium in the reaction zone is about 16 to 1. In another run the petroleum coke having a nickel and vanadium-containing ash and being in admixture with the iron and calcium-containing additive is introduced into the free-flow partial oxidation zone as a pumpable slurry of petroleum coke in water. The solids content of the slurry is about 60 weight percent.

The petroleum coke is reacted with a free-oxygen containing gas e.g. air, oxygen-enriched air, substantially pure oxygen, in the presence of a temperature moderator e.g. $H_2O$, $CO_2$, $N_2$, in the refractory lined partial oxidation reaction zone at an autogenous temperature of about 2750° F. and a pressure of about 6 atmospheres. The molten slag droplets are readily separated from the hot effluent gas stream leaving the reaction zone by gravity or by quenching and/or scrubbing the gas stream with water or other gas scrubbing medium. The ash fusion temperature (°F.) for the liquid washing agent and associated ash was below 2100° F. In comparison, the ash fusion of the coarse slag with no iron-containing additive was greater than 2750° F. The chemical composition of the slag is shown in Table I below.

TABLE I

Chemical Composition of Slag

| Slag Type (produced from) | FeS | NiS | FeO | CaO | CaS | $SiO_2$ | $V_2O_3$ | Others[1] |
|---|---|---|---|---|---|---|---|---|
| Liquid Phase Washing Agent | 81.1 | 1.2 | 4.1 | 0.8 | 1.2 | 1.1 | 6.3 | 4.2 |

[1] minor ash components and refractory pick-up

A photomicrograph (enlarged 500×) of a cross-section of the slag produced from the liquid phase washing agent and illustrating the undissolved vanadium-containing oxide laths and spinels in a matrix of liquid phase washing agent is shown in FIG. 1.

Various modifications of the invention as herein before set forth may be made without departing from the spirit and scope thereof, and therefore, only such limitations should be made as are indicated in the appended claims.

I claim:

1. A process for the production of gaseous mixtures comprising $H_2 + CO$ by the partial oxidation of a feedstock comprising a heavy liquid hydrocarbonaceous fuel having a nickel and vanadium-containing ash or petroleum coke having a nickel and vanadium-containing ash, or mixtures thereof; and said feedstock includes a minimum of 0.5 wt. % of sulfur; and said ash includes a minimum of 5.0 wt. % vanadium, a minimum of 2.0 wt. % of nickel and less than about 350 parts per million of silicon; said process comprising:
   (1) mixing together an iron-containing additive comprising at least one iron compound with said feedstock; wherein the weight ratio of iron-containing additive to ash in the reaction zone in (2) is in the range of about 1.0–10.0 to 1.0, and there is at least 10 parts by weight of iron for each part by weight of vanadium;
   (2) reacting said mixture from (1) at a temperature the range of 2200° F. to 3000° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2 + CO$ and entrained molten slag; and where in said reaction zone said iron-containing additive combines with at least a portion of said nickel constituents and sulfur found in the feedstock to produce a liquid phase washing agent that collects and transports at least a portion of the vanadium-containing oxide laths and spinels and other ash components and refractory out of the reaction zone; and
   (3) separating nongaseous materials from said hot raw effluent gas stream.

2. The process of claim 1 wherein said iron-containing additive contains iron compounds selected from the group consisting of oxides, sulfides, sulfates, carbonates, cyanides, chlorides, nitrates, and mixtures thereof.

3. The process of claim 1 wherein the iron containing portion of said iron-containing additive is a ferro or ferri organic compound selected from the group consisting of naphthenates, oxalates, acetates, citrates, benzoates, oleates, tartrates, and mixtures thereof.

4. The process of claim 1 wherein the iron containing portion of said iron-containing additive is a water soluble iron salt.

5. The process of claim 1 wherein said heavy liquid hydrocarbonaceous fuel having a nickel and vanadium-containing ash feedstock is selected from the group consisting of crude residue from petroleum distillation and cracking process operations, petroleum distillate, reduced crude, whole crude, asphalt, coal tar, coal derived oil, shale oil, tar sand oil, and mixtures thereof.

6. The process of claim 1 wherein said heavy liquid hydrocarbonaceous fuel having a nickel and vanadium-containing ash is a pumpable slurry of petroleum coke in water, liquid hydrocarbon fuel or mixtures thereof.

7. The process of claim 1 where in (1) said iron-containing additive is introduced into the feed to or the bottoms from a vacuum distillation unit.

8. The process of claim 1 wherein said mixture of iron-containing additive and feedstock from (1) has a particle size of ASTM E-11 Standard Sieve Designation in the range of about 210 microns to 37 microns, or below.

9. The process of claim 1 wherein said iron-containing additive comprises about 30.0 to 100.0 wt. % of an iron compound.

10. The process of claim 1 wherein substantially all of the sulfur in said feedstock is converted into the sulfides of iron and nickel and leaves the reaction zone in the slag.

11. The process of claim 1 wherein a calcium compound in the amount of about 2.0 to below 8.0 wt. % of said iron-containing addition agent is only introduced into the reaction zone of the partial oxidation reaction zone at start-up to reduce the softening temperature of the iron-containing addition agent, and then discontinued.

12. The process of claim 1 wherein said iron-containing additive is iron oxide; and said iron oxide is in admixture with calcium oxide.

13. The process of claim 1 where included in the iron-containing additive in (1) is an additional material compound selected from the group of elements consisting of magnesium, chromium and mixtures thereof.

14. The process of claim 13 wherein said additional material comprises magnesium and/or chromium which are provided as compounds in the total amount of about 1.0 to 10.0 wt. % of said iron-containing additive.

15. The process of claim 14 wherein said magnesium and chromium compounds are oxides.

16. The process of claim 1 wherein said liquid phase washing agent substantially comprises in wt. %: iron sulfide about 75 to 95, nickel sulfide about 0.5 to 3.0, and iron oxide about 2 to 9.

17. In a process for coking a heavy liquid hydrocarbonaceous fuel having a nickel and vanadium containing ash to produce petroleum coke and gasifying said petroleum coke to produce gaseous mixtures comprising $H_2$ and CO, the improvement comprising:

(1) mixing together said heavy liquid hydrocarbonaceous fuel with an iron-containing additive comprising at least one iron compound; wherein said heavy liquid hydrocarbonaceous fuel includes a minimum of 0.5 wt. % sulfur and has an ash which contains a minimum of 5.0 wt. % vanadium, a minimum of 2.0 wt. % nickel, and less than about 350 parts per million of silicon; and wherein the weight ratio of iron-containing additive to ash in the reaction zone in (4) is in the range of about 1.0–10.0 to 1.0, and there is at least 10 parts by weight of iron for each part by weight of vanadium;

(2) coking said mixture from (1) to produce petroleum coke having a nickel and vanadium-containing ash and having dispersed therein said iron-containing additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium;

(4) reacting said petroleum coke from (3) at a temperature in the range of 2200° F. to 3000° F. and a pressure in the range of about 5 to 250 atmospheres in said free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said iron-containing additive combined with at least a portion of said nickel constituents and sulfur found in the feedstock to produce a liquid phase washing carrier that collects and transports a portion of the vanadium-containing oxide laths and spinels and other ash components and refractory out of the reaction zone; and (5) separating nongaseous materials from said hot raw effluent gas stream.

18. The process of claim 17 wherein said iron-containing additive contains iron compounds selected from the group consisting of oxides, sulfides, sulfates, carbonates, cyanides, chlorides, nitrates, and mixtures thereof.

19. The process of claim 17 wherein said mixture of iron-containing additive and feedstock from (1) has a particle size of ASTME-11 Standard Sieve Designation in the range of about 210 microns to 37 microns or below.

20. The process of claim 17 wherein said iron-containing additive includes an inorganic or organic compound of iron.

21. The process of claim 17 wherein said ash-containing heavy liquid hydrocarbonaceous fuel is a high boiling liquid petroleum feed to or the bottoms from a vacuum tower or a fractionator.

22. The process of claim 17 where in (2) the mixture from (1) at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead and said petroleum coke having a nickel and vanadium-containing ash and having uniformly dispersed therein said iron-containing additive is removed from the bottom.

23. The process of claim 17 where in (2) the mixture from (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon efflent vapor and steam are removed overhead and said petroleum coke is removed from the bottom.

24. The process of claim 17 where in (5) said nongaseous materials are separated from said hot effluent gas stream by contacting the gas stream from (4) with a water or oil scrubbing medium.

25. The process of claim 17 where included in the iron-containing additive in (1) is an additional material compound selected from the group of elements consisting of magnesium, chromium, and mixtures thereof.

26. The process of claim 25 wherein said additional material comprises magnesium and/or chromium which is provided as compounds in the total amount of about 1.0 to 10.0 wt. % of the iron-containing additive.

27. The process of claim 26 wherein said magnesium and chromium compounds are oxides.

28. The process of claim 17 wherein substantially all of the sulfur in said feedstock is converted into the sulfides of iron and nickel and leaves the reaction zone in the slag.

29. The process of claim 17 wherein a calcium compound in the amount of about 2.0 to below 8.0 wt. % of said iron-containing addition agent is temporarily introduced into the reaction zone of the partial oxidation reaction zone only at start-up to reduce the softening temperature of the iron-containing addition agent, and then the introduction of said calcium compound is discontinued.

* * * * *